United States Patent
Mizunuma et al.

(10) Patent No.: US 9,983,439 B2
(45) Date of Patent: May 29, 2018

(54) DISPLAY DEVICE

(71) Applicant: Japan Display Inc., Minato-ku (JP)

(72) Inventors: Tatsuro Mizunuma, Tokyo (JP); Shigesumi Araki, Tokyo (JP); Hirohisa Miki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days. days.

(21) Appl. No.: 15/185,959

(22) Filed: Jun. 17, 2016

(65) Prior Publication Data

US 2017/0003548 A1    Jan. 5, 2017

(30) Foreign Application Priority Data

Jul. 2, 2015    (JP) .................................. 2015-133598

(51) Int. Cl.
*G02F 1/1335*    (2006.01)
*G02F 1/1343*    (2006.01)
*G02F 1/1362*    (2006.01)

(52) U.S. Cl.
CPC .. *G02F 1/133617* (2013.01); *G02F 1/133526* (2013.01); *G02F 1/134363* (2013.01); *G02F 1/133514* (2013.01); *G02F 1/133528* (2013.01); *G02F 1/133555* (2013.01); *G02F 2001/133614* (2013.01); *G02F 2001/136222* (2013.01); *G02F 2202/36* (2013.01)

(58) Field of Classification Search
CPC ............... G02F 2001/136222; G02F 1/133514
See application file for complete search history.

(56) References Cited

U.S. PATENT DOCUMENTS

2004/0041965 A1* 3/2004 Liu .................. G02F 1/133555
                                                       349/113
2014/0204319 A1* 7/2014 Cai .................. G02F 1/133514
                                                       349/106

FOREIGN PATENT DOCUMENTS

JP           2015-36733         2/2015

* cited by examiner

*Primary Examiner* — Wen-Ying P Chen
(74) *Attorney, Agent, or Firm* — Oblon, McClelland, Maier & Neustadt, L.L.P.

(57) ABSTRACT

According to one embodiment, a wavelength converter includes a microlens which condenses excitation light, a reflective layer which is opposed to the microlens and includes an aperture, and a wavelength conversion element which is opposed to the microlens via the reflective layer, absorbs the excitation light, and emits emission light whose wavelength is different from that of the excitation light.

18 Claims, 9 Drawing Sheets

DISPLAY DEVICE

CROSS-REFERENCE TO RELATED APPLICATIONS

This application is based upon and claims the benefit of priority from Japanese Patent Application No. 2015-133598, filed Jul. 2, 2015, the entire contents of which are incorporated herein by reference.

FIELD

Embodiments described herein relate generally to a wavelength converter and a display device using the same.

BACKGROUND

A display device comprising a light source and a wavelength converter realizes color display as light emitted from the light source is selectively transmitted through the wavelength converter. As the means for improving the light use efficiency from the backlight unit as the light source, a liquid crystal display device in which a selective reflection member capable of reflecting majority of light from a backlight unit and also transmitting visible light, and a light conversion member including a fluorescent material such as quantum dots are combined is disclosed.

DETAILED DESCRIPTION

In general, according to one embodiment, a wavelength converter comprises: a microlens which condenses excitation light; a reflective layer which is opposed to the microlens and includes an aperture; and a wavelength conversion element which is opposed to the microlens via the reflective layer, absorbs the excitation light, and emits emission light whose wavelength is different from that of the excitation light.

According to another embodiment, a display device comprises: a display panel comprising a first substrate, a second substrate arranged to be opposed to the first substrate, and a liquid crystal layer held between the first substrate and the second substrate; a light source which is disposed on a side opposed to the first substrate of the display panel, and emits excitation light toward the display panel; a first polarizer arranged between the first substrate and the light source; a second polarizer opposed to the first polarizer via the display panel; and a wavelength converter comprising microlenses which condense the excitation light, a reflective layer which is opposed to the microlenses and includes apertures, and a first wavelength conversion element and a second wavelength conversion element which are opposed to the microlenses via the reflective layer, absorb the excitation light, and emit first emission light and second emission light whose wavelengths are different from the wavelength of the excitation light, respectively.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the drawings may be more schematic than in the actual modes, but they are mere examples, and do not limit the interpretation of the present invention. Besides, in the present specification and drawings, the structural elements, which have functions identical or similar to the functions described in connection with preceding drawings, are denoted by the same reference numbers, and an overlapping detailed description thereof may be arbitrarily omitted.

Figure 1:
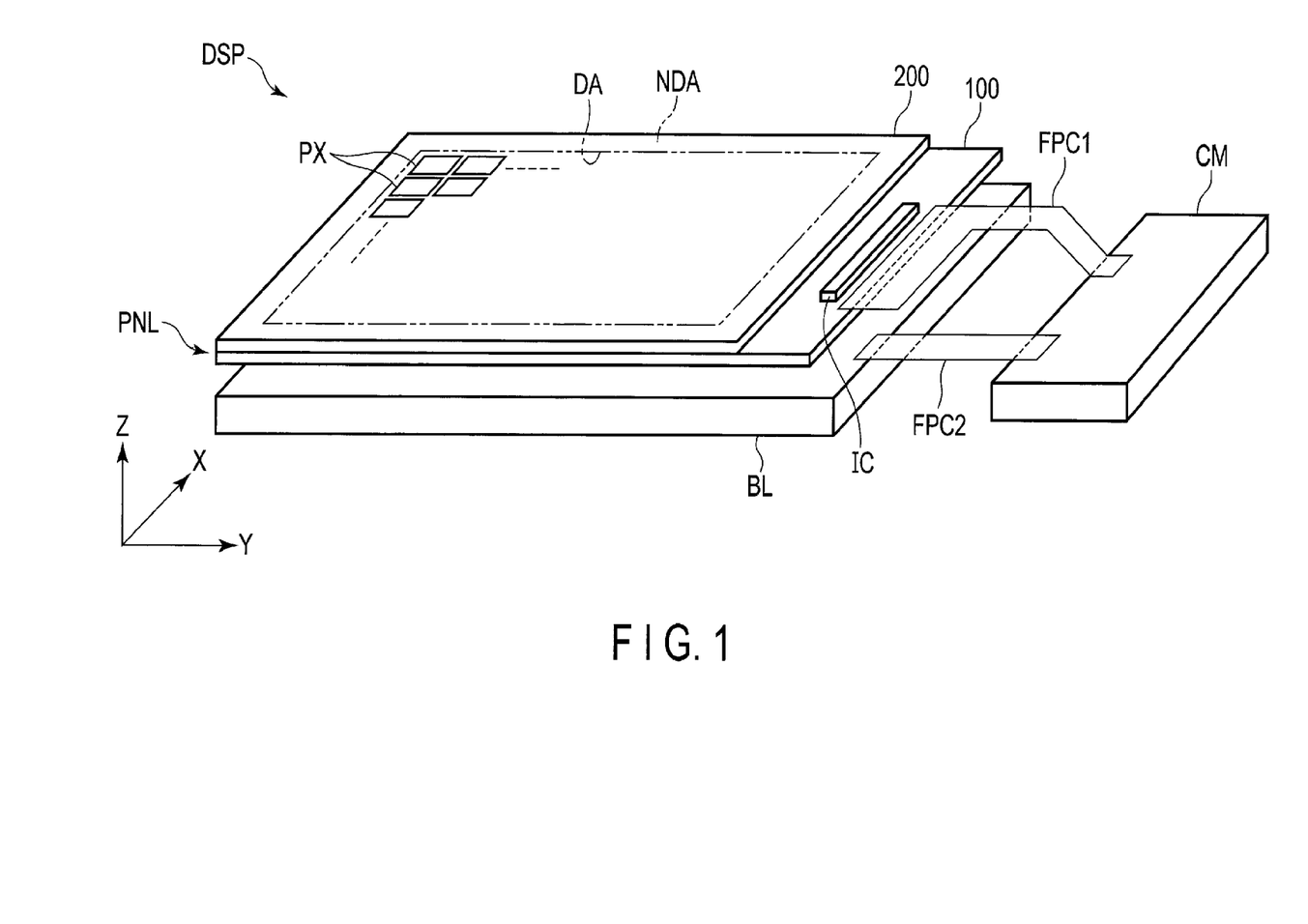
FIG. 1 is a perspective view showing a display device according to the present embodiment.

FIG. 1 is a perspective view showing a display device according to the present embodiment.

Note that in the present embodiment, while a case where the display device comprises a liquid crystal display panel will be described, the embodiment is not limited to this. That is, the display device may comprise a self-luminous display panel such as an organic electroluminescent panel, an electronic paper display panel of cataphoretic elements, or the like.

A display device DSP comprises a display panel PNL, a driving IC chip IC which drives the display panel PNL, a backlight unit BL which illuminates the display panel PNL, a control module CM which controls the operation of the display panel PNL and the backlight unit BL, flexible printed circuits FPC1 and FPC2 which transmit control signals to the display panel PNL and the backlight unit BL, and the like. In the present embodiment, a first direction X is, for example, a short-side direction of the display panel PNL. A second direction Y is the direction which crosses the first direction X, and is, in other words, a long-side direction of the display panel PNL. Further, a third direction Z is the direction which crosses the first direction X and the second direction Y. Furthermore, it is assumed that the main surface is a plane parallel to the X-Y plane defined by the first direction X and the second direction Y.

The display panel PNL comprises a first substrate 100, a second substrate 200 arranged to be opposed to the first substrate 100, and a liquid crystal layer (a liquid crystal layer LQ to be described later) held between the first substrate 100 and the second substrate 200. The display panel PNL includes a display area DA on which an image is displayed, and a frame-shaped non-display area NDA located around the display area DA. The display panel PNL comprises, for example, pixels PX arranged in a matrix in the first direction X and the second direction Y within the display area DA.

Note that in the description of the present embodiment, it is assumed that a display surface or front surface of the display panel PNL is the surface on which the display area DA is located, and a back surface of the display panel PNL is the surface positioned on the opposite side of the display surface. Further, in each of layers provided in the display panel PNL, a front surface refers to a surface positioned on the front surface side of the display panel PNL, and a back surface refers to a surface positioned on the back surface side of the display panel PNL. Furthermore, in each of layers provided in the display panel PNL, the top (upward) is intended as the direction toward the front surface of the display panel PNL, and the bottom (downward) is intended as the direction toward the back surface of the display panel PNL.

The backlight unit BL which is an example of a light source is disposed on the back surface side of the display panel PNL, and is opposed to the first substrate 100. That is, excitation light emitted from the backlight unit BL enters from the back surface side of the display panel PNL. Various types of backlight units can be applied as the backlight unit BL, and the type of backlight unit is not particularly limited. For example, a direct type, wherein a light-emitting element such as a light-emitting diode (LED) is arranged in a plane parallel to the main surface, or an edge type, wherein the light-emitting element is arranged at an end portion of a light guide plate, may be employed.

The driving IC chip IC is mounted on the first substrate 100 of the display panel PNL. The flexible printed circuit FPC1 is mounted on the first substrate 100, and makes connection between the display panel PNL and the control module CM. The flexible printed circuit FPC2 makes connection between the backlight unit BL and the control module CM.

The display device DSP of such a configuration corresponds to what is called a transmissive liquid crystal display device comprising a transmission display function of displaying an image by selectively passing light incident on the display panel PNL from the backlight unit BL by each of the pixels PX. However, the display device DSP may be what is called a reflective liquid crystal display device comprising a reflective display function of displaying an image by selectively reflecting the external light incident on the display panel PNL from the outside by each of the pixels PX, or a transflective liquid crystal display device comprising functions of both the transmissive and reflective liquid crystal display devices. In the reflective liquid crystal display device, a front light unit may be arranged on the front surface side or the display surface side of the display panel PNL as the light source. In the following, a transmissive liquid crystal display device will be described as an example of the liquid crystal display device.

Figure 2:
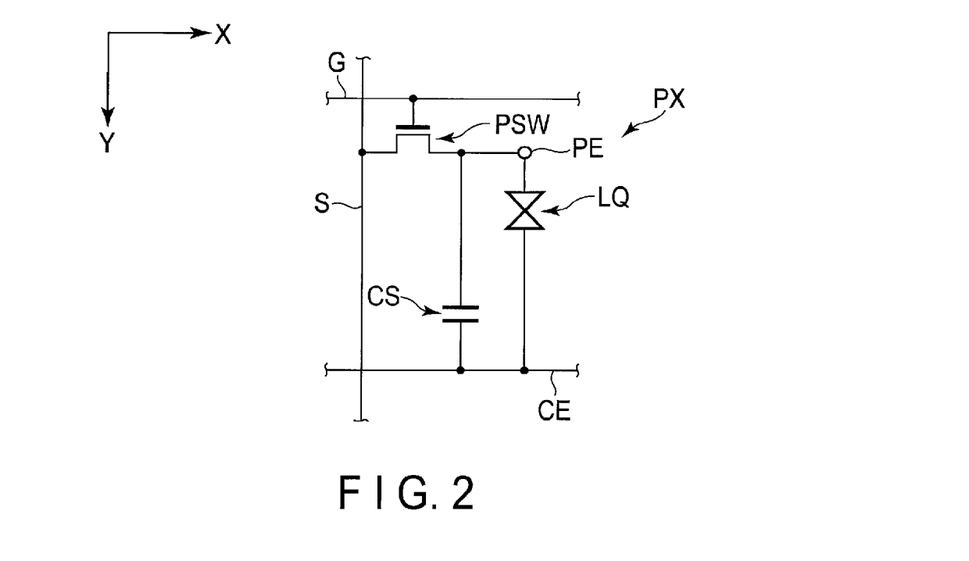
FIG. 2 is an illustration showing a structure of a pixel.

FIG. 2 is an illustration showing a structure of a pixel.

Each of the pixels PX comprises a switching element PSW, a pixel electrode PE, a common electrode CE, a liquid crystal layer LQ, etc. The switching element PSW is formed of, for example, a thin-film transistor (TFT). The switching element PSW is electrically connected to a scanning line G, a signal line S, and the pixel electrode PE. For example, the scanning line G extends in the first direction X, and the signal line S extends in the second direction Y. Note that the scanning line G and the signal line S may be formed straight, or at least partly curved. The liquid crystal layer LQ is driven by an electric field produced between the pixel electrode PE and the common electrode CE. A storage capacitance CS is, for example, a capacitance produced between the common electrode CE and the pixel electrode PE.

Figure 3:
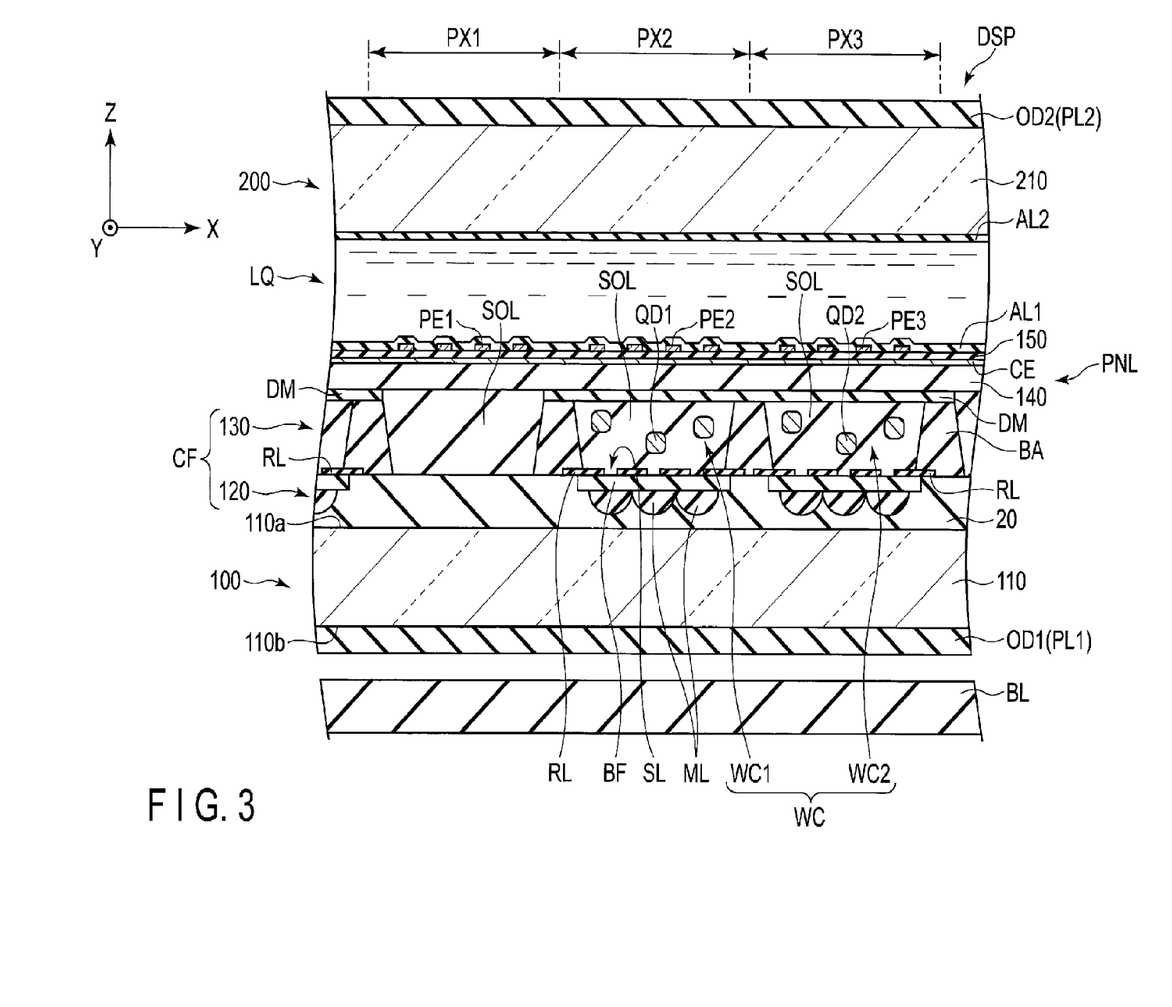
FIG. 3 is an illustration showing a cross-section of the display device according to the present embodiment.

FIG. 3 is an illustration showing a cross-section of the display device according to the present embodiment. More specifically, FIG. 3 shows a cross-section which is parallel to the X-Z plane including a first pixel PX1, a second pixel PX2, and a third pixel PX3.

That is, the display device DSP comprises the backlight unit BL, the display panel PNL, etc., described above. Note that the display panel PNL illustrated has a structure provided for a display mode which mainly uses a lateral electric field parallel to the substrate main surface, but the structure is not particularly limited. The panel may have a structure provided for a display mode using a longitudinal electric field perpendicular to the substrate main surface, an oblique electric field inclined to the substrate main surface or a combination thereof. In the display mode using a lateral electric field, for example, a structure in which the first substrate 100 is provided with both the pixel electrode PE and the common electrode CE is applicable. In the display mode using a longitudinal electric field or an oblique electric field, for example, a structure in which the first substrate 100 is provided with the pixel electrode PE and the second substrate 200 is provided with the common electrode CE is applicable.

In the display panel PNL, the first substrate 100 and the second substrate 200 are bonded to each other with a predetermined gap formed therebetween. The liquid crystal layer LQ is held between the first substrate 100 and the second substrate 200.

The first substrate 100 comprises a first insulating substrate 110, a light-condensing layer 120, a wavelength conversion layer 130, a first insulating film 140, the common electrode CE, a second insulating film 150, pixel electrodes PE1 to PE3, and a first alignment film AL1. It should be noted that the switching elements, gate lines, signal lines and various insulating films are not illustrated. The light-condensing layer 120 and the wavelength conversion layer 130 constitute a wavelength converter CF.

The first insulating substrate 110 is formed of an insulating material having light transmissivity such as a glass substrate or a resin substrate. The first insulating substrate 110 includes a first main surface 110a on a side opposed to the second substrate 200, and a second main surface 110b positioned on the opposite side of the first main surface 110a. The second main surface 110b is positioned on a side opposed to the backlight unit BL. In the present embodiment, the first insulating substrate 110 corresponds to a support substrate.

The light-condensing layer 120 comprises an optical material layer 20, a microlens ML, and a buffer layer BF. Also, the light-condensing layer 120 is disposed on the first main surface 110a of the support substrate 110. The optical material layer 20 is formed on the first main surface 110a of the support substrate 110 by using, for example, a transparent material such as resin or glass.

The microlens ML is formed above the support substrate 110 via the optical material layer 20. A refractive index of a material which forms the microlens ML is different from that of a transparent material which forms the optical material layer 20. In the example illustrated, the microlens ML has a convex surface protruding toward the support substrate 110, and the cross-section thereof is semi-circular. In this case, the microlens ML is formed of a material having a higher refractive index than that of the optical material layer 20. The shape or position, etc., of the microlens ML is not limited to the illustrated example as long as the microlens ML has the function of condensing the excitation light entering from the bottom upward. For example, the microlens ML may have a polygonal such as triangular cross-section, or a semi-elliptical cross-section. Such microlenses ML are aligned in the first direction X, and constitute a lens array. Details of the shape of the microlens ML will be described later, but the microlens ML may be a cylindrical lens extending in the second direction Y, or may form a plurality of dot patterns aligned in the second direction Y.

The buffer layer BF is arranged between the microlens ML and the wavelength conversion layer 130. The buffer layer BF is arranged to adjust the focal distance of the microlens ML in the third direction Z. A material which forms the buffer layer BF is not particularly limited, and the buffer layer BF may be formed of the same material as that of the microlens ML, for example. Further, if adjusting the focal distance of the microlens ML is unnecessary, the buffer layer BF may not be arranged. That is, the microlens ML may be adjacent to the wavelength conversion layer 130.

The wavelength conversion layer 130 comprises a reflective layer RL, a wavelength conversion element WC, a bank BA, and a dielectric multilayer film DM. Further, the wavelength conversion layer 130 is disposed on the light-condensing layer 120. That is, the wavelength conversion element WC is embedded in the first substrate 100.

The reflective layer RL is opposed to the microlens ML via the buffer layer BF. The reflective layer RL has an aperture SL. The aperture SL is formed on an optical path of the excitation light condensed by the microlens ML, and the shape of the aperture SL is determined according to a beam cross-section of the condensed excitation light. For example, the width of the aperture SL along the first direction X is set to be greater than or equal to the width of the beam cross-section of the excitation light along the first direction X. As will be described later referring to FIG. 9, the reflective layer RL reflects emission light, which is the light emitted from the wavelength conversion element WC. Accordingly, the ratio of an area of the reflective layer RL in the lower surface of the wavelength conversion element WC should preferably be high, in other words, the ratio of an area of apertures SL in the lower surface of the wavelength conversion element WC should preferably be low. That is, the reflective layer RL should preferably be arranged at a place where the beam cross-section of the excitation light is reduced at the maximum at the aperture SL. The reflective layer RL is formed of a material having a high reflectivity against the excitation light, such as a metallic thin film.

In the example illustrated, at an area corresponding to one pixel, a plurality of microlenses ML are arranged, and a plurality of apertures SL are formed. In a case where only one microlens ML is formed at an area corresponding to one pixel, in order to sufficiently condense the excitation light and introduce it to the wavelength conversion element WC, a microlens ML whose curvature of the convex surface is high and which is thick in the third direction Z must be arranged. Alternatively, if the microlenses ML are not formed in the above way, in order to introduce excitation light which is not sufficiently condensed to the wavelength conversion element WC, a reflective layer RL in which the area of the apertures SL is large must be arranged. As a plurality of microlenses ML are arranged at an area corresponding to one pixel, in the display device DSP, the light-condensing layer 120 comprising the microlenses ML can be formed thin. Also, in the display device DSP, the ratio of the area of the apertures SL in the lower surface of the wavelength conversion element WC can be reduced, and downward leakage of the emission light from the wavelength conversion element WC through the apertures SL can be suppressed.

The wavelength conversion element WC is formed on the reflective layer RL, and is opposed to the microlenses ML via the reflective layer RL. The wavelength conversion element WC absorbs the excitation light and emits emission light whose wavelength is different from that of the excitation light. For example, the wavelength conversion element WC comprises a first wavelength conversion element WC1 and a second wavelength conversion element WC2. The first wavelength conversion element WC1 and the second wavelength conversion element WC2 are formed in areas corresponding to the second pixel PX2 and the third pixel PX3, respectively, and are adjacent to each other in the first direction X. The first wavelength conversion element WC1 and the second wavelength conversion element WC2 comprise different emitting materials. These emitting materials each have an absorption band including a peak wavelength of the excitation light, and have different emission wavelengths. Accordingly, the first wavelength conversion element WC1 and the second wavelength conversion element WC2 convert the excitation light into emission light of different wavelengths, respectively.

In the example illustrated, the first wavelength conversion element WC1 comprises a solid-state support SOL, and a first quantum dot QD1 which serves as the emitting material dispersed in the solid-state support SOL. In addition, the second wavelength conversion element WC2 comprises a solid-state support SOL, and a second quantum dot QD2 which serves as the emitting material dispersed in the solid-state support SOL. The solid-state support SOL is formed of, for example, a resin material such as a thermosetting resin or a photosetting resin.

Each of the first quantum dot QD1 and the second quantum dot QD2 is a semiconducting fine particle having a diameter of several nanometers to several tens of nanometers. A quantum dot forming each of the first quantum dot QD1 and the second quantum dot QD2 is formed of, for example, a group II-VI semiconductor or group III-V semiconductor having a wurtzite or sphalerite crystalline structure. Also, such a quantum dot is formed in, for example, a core-shell structure. The core is located at the center of the quantum dot and is formed of, for example, cadmium selenide (CdSe), cadmium telluride (CdTe), indium phosphide (InP), or the like. The shell covers the surrounding of the core to stabilize the core physically and chemically. The surrounding of the shell may be modified by an organic molecule. The shell is formed of, for example, zinc sulfide (ZnS), cadmium sulfide (CdS), or the like. The optical properties of the quantum dot are determined mainly by the properties of the core. For example, the emission wavelength of the quantum dot can be adjusted by the type or size of a semiconductor used for the core. Accordingly, as the second wavelength conversion element WC2 comprises the second quantum dot QD2 which is different from the first quantum dot QD1 in size, the second wavelength conversion element WC2 can have an emission wavelength different from that of the first wavelength conversion element WC1.

The shape of the quantum dot is not particularly limited, and the quantum dot may have an anisotropic shape, that is, be shaped like a rod, for example. Further, such a rod-shaped quantum dot is referred to as a quantum rod. Each of the lengths along the long axis and the short axis of the quantum rod ranges from several nanometers to several tens of nanometers. The polar axis of such a quantum rod is, for example, a c-axis or <111> axis, and agrees with the long axis. The quantum rod has optical absorption anisotropy depending on the direction of the polar axis, and emits polarized light. Accordingly, when the first quantum dot QD1 and the second quantum dot QD2 are quantum rods, and are aligned in the same direction, the first wavelength conversion element WC1 and the second wavelength conversion element WC2 have optical absorption anisotropy and emit polarized light.

Note that the optical absorption anisotropy mentioned above is intended as the property that the absorbance of the quantum rod depends on the angle formed by the long axis of the quantum rod and polarization of the excitation light. For example, the quantum rod absorbs the excitation light polarized parallel to the long axis of the quantum rod, and emits emission light polarized parallel to the long axis of the quantum rod. A wavelength conversion element comprising such a quantum rod as the emitting material can change the wavelength while maintaining the direction of polarization.

The bank BA is formed between the respective wavelength conversion elements of the wavelength conversion element WC, and is positioned at a boundary between pixels. While detailed illustration of the bank BA is not provided, the bank BA delimits the respective wavelength conversion elements of the wavelength conversion element WC in a direction parallel to the X-Y plane. The bank BA is formed of, for example, a resin material. The bank BA should preferably have a light-blocking property. Preferably, the reflective layer RL should also be formed between the bank BA and the wavelength conversion element WC. When the bank BA is covered by the reflective layer RL, the bank BA may be formed of a transparent resin material.

The dielectric multilayer film DM is provided on the wavelength conversion element WC. The dielectric multilayer film DM is opposed to the reflective layer RL via the wavelength conversion element WC. The dielectric multilayer film DM is formed by alternately stacking a dielectric thin film whose refractive index is different from a previously stacked one, reflects the excitation light from the light source toward the wavelength conversion element WC, and passes the emission light whose wavelength has been converted by the wavelength conversion element WC. In the present embodiment, the dielectric multilayer film DM is a laminate of silicon oxide $SiO_2$ and titanium oxide $TiO_2$.

The first insulating film 140 is formed on the wavelength conversion layer 130. The first insulating film 140 includes an insulating film formed of an inorganic insulating material, and an insulating film formed of an organic insulating material. In one example, the first insulating film 140 includes an insulating film which covers each of a semiconductor layer of the switching element PCW, the scanning line G, and the signal line S shown in FIG. 2.

The common electrode CE is formed on the first insulating film 140. The common electrode CE is arranged over the first pixel PX1 to the third pixel PX3. The second insulating film 150 is formed on the common electrode CE. The second insulating film 150 is formed of, for example, an inorganic insulating material such as silicon nitride or silicon oxide. The pixel electrodes PE1 to PE3 are arranged on the second insulating film 150 at areas corresponding to the first pixel PX1 to the third pixel PX3, respectively. The common electrode CE and the pixel electrodes PE1 to PE3 are each formed of a transparent conductive material such as indium-tin-oxide (ITO) or indium-zinc-oxide (IZO). The first alignment film AL1 is formed on the second insulating film 150. Also, the first alignment film AL1 covers the pixel electrodes PE1 to PE3.

The second substrate 200 comprises a second insulating substrate 210, and a second alignment film AL2. The second insulating substrate 210 is formed of an insulating material having light transmissivity such as a glass substrate or a resin substrate. The second alignment film AL2 is formed on a side of the second insulating substrate 210, which is opposed to the liquid crystal layer LQ. Each of the first alignment film AL1 and the second alignment film AL2 is formed of, for example, a resin material such as polyimide.

The first alignment film AL1 and the second alignment film AL2 are subjected to alignment treatment as needed. Further, each of the first alignment film AL1 and the second alignment film AL2 is formed of a material having a suitable alignment property such as a horizontal alignment property or a vertical alignment property according to the display mode of the liquid crystal.

The display panel PNL further comprises a first optical element OD1 and a second optical element OD2. The first optical element OD1 is arranged on a side of the second main surface 110b of the first insulating substrate 110. That is, the first optical element OD1 is disposed between the first substrate 100 and the backlight unit BL. The first optical element OD1 comprises a first polarizer PL1. The second optical element OD2 is arranged on the front surface side of the second substrate 200. That is, the second optical element OD2 is arranged on the second insulating substrate 210. The second optical element OD2 comprises a second polarizer PL2. Accordingly, the first polarizer PL1 and the second polarizer PL2 are opposed to each other via the liquid crystal layer LQ and the wavelength converter CF. Note that the first optical element OD1 and the second optical element OD2 may further comprise other optical function layers such as a retardation film. In one example, the first polarizer PL1 and the second polarizer PL2 are disposed, for example, in a crossed-Nicol relationship in which their transparent axes are orthogonal to each other. Each of the first polarizer PL1 and the second polarizer PL2 may be a film-type polarizer obtained by dying a resin material such as polyvinyl alcohol with iodine or pigment, or a wire-grid polarizer obtained by arranging fine metal lines at a regular pitch.

In the example illustrated, at an area corresponding to the first pixel PX1, the wavelength conversion element WC is not arranged, but a solid-state support SOL in which no emitting material is dispersed is disposed on the light-condensing layer 120. Also, at an area corresponding to the first pixel PX1, the microlenses ML, the buffer layer BF, and the dielectric multilayer film DM are not arranged, so that the solid-state support SOL is adjacent to the optical material layer 20 and the first insulating film 140 in the third direction Z. However, the microlenses ML and the buffer layer BF may be provided also in the area corresponding to the first pixel PX1.

Figure 4:
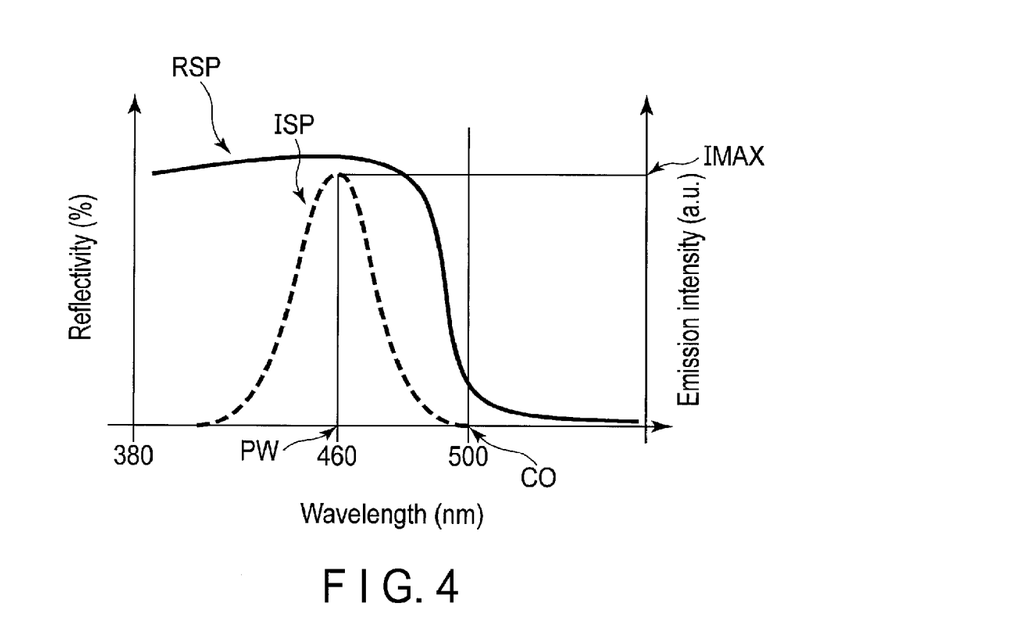
FIG. 4 is a graph showing an example of the optical properties of a dielectric multilayer film.

FIG. 4 is a graph showing an example of the optical properties of the dielectric multilayer film.

The graph of the drawing shows the reflectance spectrum RSP of the dielectric multilayer film DM and the emission intensity spectrum ISP of the excitation light obtained when blue excitation light was applied. The vertical axis of the graph represents the reflectivity of the reflectance spectrum RSP or the emission intensity of the emission intensity spectrum ISP. The horizontal axis of the graph represents the wavelength.

The emission intensity spectrum ISP has a peak intensity IMAX at a wavelength of 460 nm, for example. That is, a peak wavelength PW of the emission intensity spectrum ISP is 460 nm. A cutoff wavelength CO of the dielectric multilayer film DM is a longer wavelength than the peak wavelength PW of the excitation light. In the example illustrated, a cutoff wavelength of the dielectric multilayer film DM is 500 nm, and the reflectance spectrum RSP has a high reflectivity in a wavelength band below 500 nm, and has a low reflectivity in a wavelength band of the wavelength of 500 nm or more. That is, the dielectric multilayer film DM is designed to selectively reflect light having a wavelength shorter than 500 nm, and to allow light having a wavelength longer than 500 nm to pass therethrough. Therefore, excitation light having the optical properties of the emission intensity spectrum ISP is reflected by the dielectric multilayer film DM.

Note that the reflectivity of the dielectric multilayer film DM depends on the angle of incidence. Also, in the dielectric multilayer film DM, the reflectivity against S-polarized light is different from that against P-polarized light. As an example, the dielectric multilayer film DM should preferably be designed such that the reflectivity against S-polarized excitation light becomes 90% or more at all angles of incidence.

Next, the behavior of excitation light and emission light in the present embodiment will be described.

Figure 5:
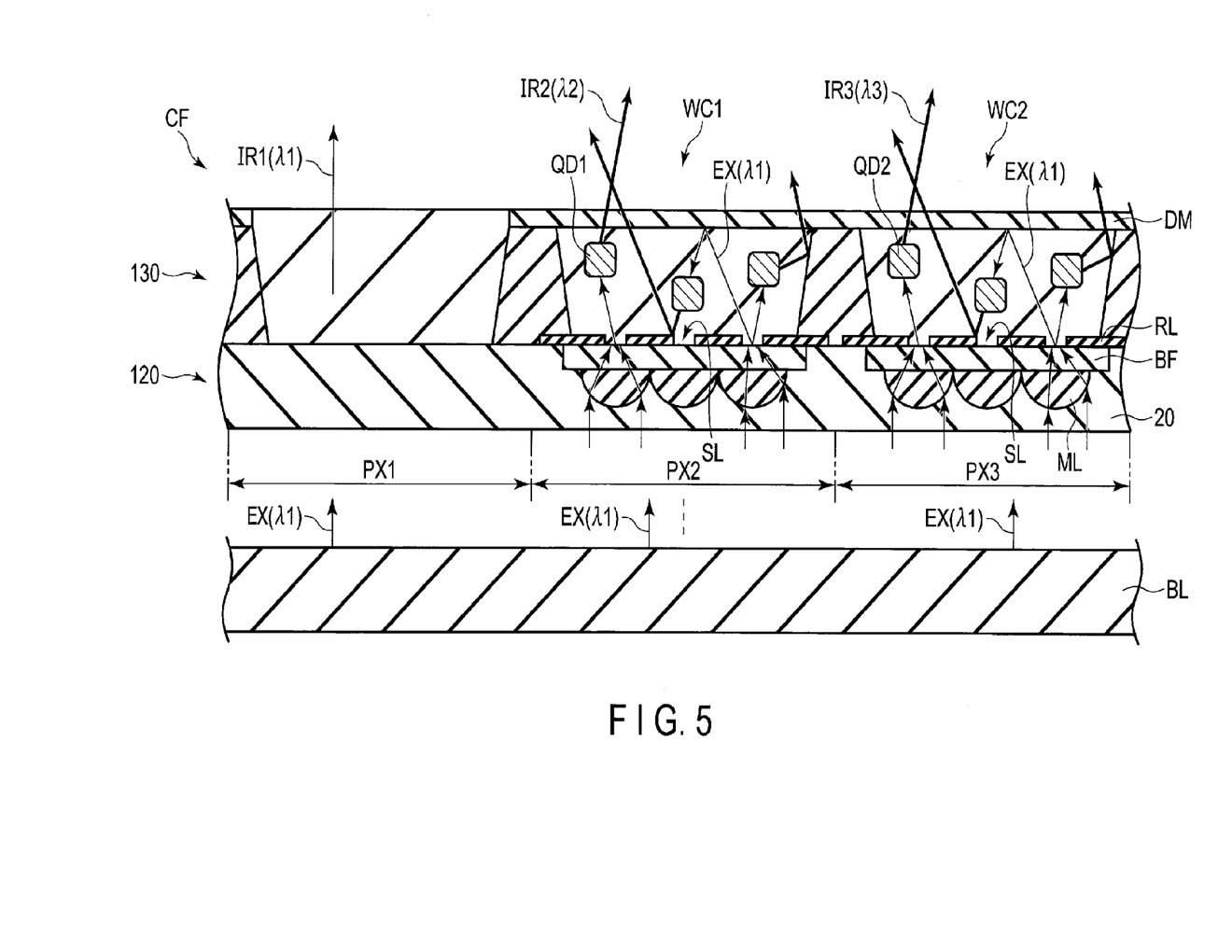
FIG. 5 is an illustration showing the operation of a wavelength converter.

FIG. 5 is an illustration showing the operation of the wavelength converter CF. It is assumed that wavelength $\lambda 1$ in the drawing represents the peak wavelength of excitation light EX and first emission light IR1, and wavelengths $\lambda 2$ and $\lambda 3$ represent the peak wavelengths of second emission light IR2 and third emission light IR3, respectively. In one example, wavelength $\lambda 1$ is a wavelength within a blue range of 380 to 500 nm, or a wavelength within an ultraviolet range, which is an even shorter wavelength than that of the blue range. As a light source which emits light of such a wavelength $\lambda 1$, an LED or a semiconductor laser, etc., is applicable. For example, wavelength $\lambda 2$ is a wavelength in a green range of 500 to 610 nm, and wavelength $\lambda 3$ is a wavelength in a red range of 610 to 780 nm. That is, the excitation light EX and the first emission light IR1 are each blue light, the second emission light IR2 is green light, and the third emission light IR3 is red light.

The excitation light EX emitted from the backlight unit BL is incident on the lower surface of the wavelength converter CF. Further, the excitation light EX incident on the wavelength converter CF from the backlight unit BL should preferably be parallel light that is parallel to a normal direction of the main surface of the wavelength converter CF. Accordingly, in order to adjust the angle of incidence of the excitation light EX transmitted from the backlight unit BL to the wavelength converter CF, the display device DSP should preferably be provided with various optical elements such as a prism sheet between the backlight unit BL and the display panel PNL.

The excitation light EX which propagates through the light-condensing layer 120 passes through the wavelength conversion layer 130, and is emitted from the upper surface of the wavelength converter CF as the first emission light IR1 while the wavelength being maintained as wavelength $\lambda 1$ at an area corresponding to the first pixel PX1. At the second pixel PX2 and the third pixel PX3, the optical path of the excitation light EX which propagates through the light-condensing layer 120 is refracted when the light enters the microlens ML from the optical material layer 20. The excitation light EX which is refracted by the microlens ML enters the first wavelength conversion element WC1 or the second wavelength conversion element WC2 through the aperture SL.

Part of the excitation light EX which has entered the first wavelength conversion element WC1 is absorbed by the first quantum dot QD1. The excitation light EX not absorbed by the aforementioned first quantum dot QD1 is absorbed by the other first quantum dots QD1 while the excitation light EX is reflected between the dielectric multilayer film DM and the reflective layer RL. The first quantum dots QD1 which have absorbed the excitation light EX emit the second emission light IR2 having wavelength $\lambda 2$, which is a longer wavelength than wavelength $\lambda 1$ of the excitation light EX.

The second emission light IR2 is emitted from the first quantum dots QD1 in all directions.

Wavelength $\lambda 2$ of the second emission light IR2 is a longer wavelength than the cutoff wavelength CO of the dielectric multilayer film DM. That is, a reflectivity of the dielectric multilayer film DM against the second emission light IR2 is lower than that against the excitation light EX. Also, the reflective layer RL should preferably have a lower reflectivity against the excitation light EX and a higher reflectivity against the second emission light IR2 as compared to the reflectivities exhibited by the dielectric multilayer film DM. Accordingly, the majority of the second emission light IR2 which is emitted upward passes through the dielectric multilayer film DM, and is emitted from the wavelength converter CF. Part of the second emission light IR2 reflected by the dielectric multilayer film DM is also eventually emitted from the wavelength converter CF by passing through the dielectric multilayer film DM while it is reflected between the dielectric multilayer film DM and the reflective layer RL. Meanwhile, since the area of the reflective layer RL is greater than the area of the apertures SL, the majority of the second emission light IR2 emitted downward is reflected by the reflective layer RL and directed to the dielectric multilayer film DM. Also, since the bank BA is formed to be tapered having a smaller upper surface area than the lower surface area, the second emission light IR2 emitted toward the bank BA is reflected by the bank BA and directed to the dielectric multilayer film DM. Also in the second wavelength conversion element WC2, as in the first wavelength conversion element WC1, the third emission light IR3 is reflected by the reflective layer RL and the bank BA, and is emitted from the wavelength converter CF by passing through the dielectric multilayer film DM.

It should be noted that in the example illustrated, the microlenses ML are not opposed to the banks BA in the third direction. However, the embodiment is not limited to the above, and the microlenses ML may be opposed to the banks BA in the third direction. In the example illustrated, the excitation light EX emitted from the backlight unit BL toward the banks BA is reflected by the lower surfaces of the respective banks BA, and is reflected again at the side of the backlight unit BL and reused. However, during a process of reuse, some of the excitation light EX may be lost by the absorption or dispersion. If the microlenses ML are opposed to the banks BA, excitation light EX emitted from the backlight unit BL toward the banks BA is also refracted by the microlenses ML, and is allowed to propagate to the wavelength conversion element by passing through the apertures SL. That is, the light use efficiency of the backlight unit BL can be improved.

Figure 6:
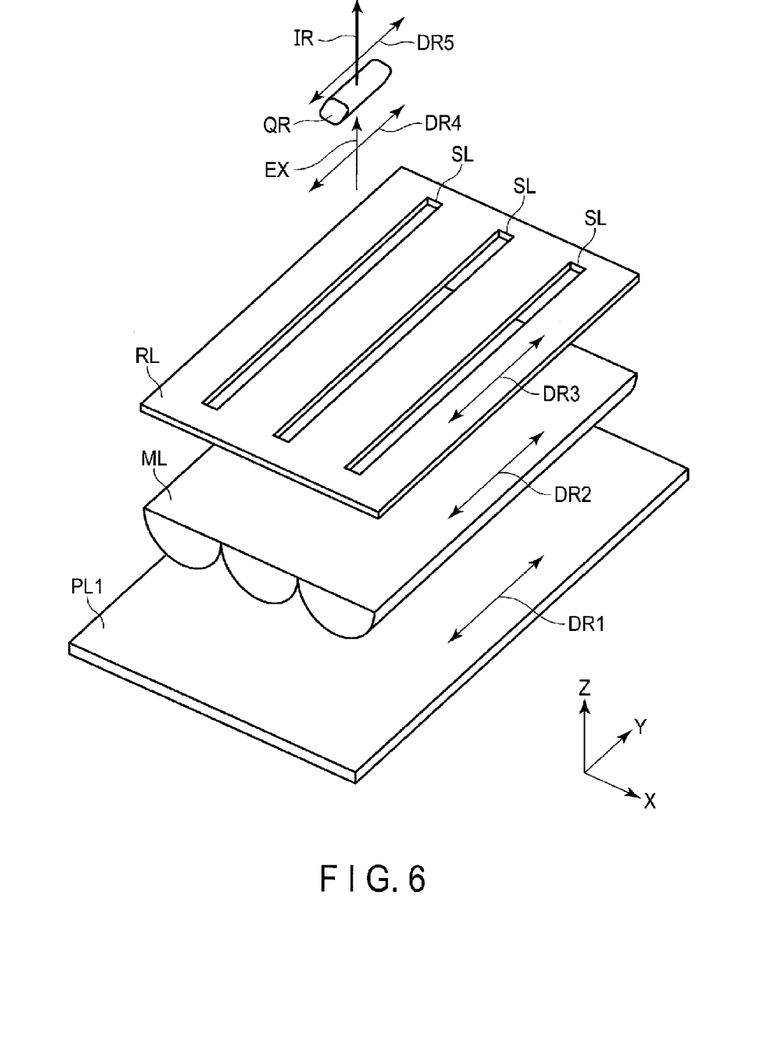
FIG. 6 is an illustration showing the direction in which an absorption axis of a quantum rod, and a cylindrical microlens extend.

FIG. 6 is an illustration which shows the direction in which an absorption axis of the quantum rod, and a cylindrical microlens extend.

A transparent axis direction DR1 of the first polarizer PL1 extends parallel to the second direction Y, for example. In the example illustrated, each of the microlenses ML is a cylindrical lens in which a convex portion protruding downward extends in the second direction Y. In other words, the microlens ML has a semicylindrical shape in which a generatrix is parallel to the second direction Y. The microlens ML does not refract the excitation light EX entering from the bottom in the second direction Y, but refracts the excitation light EX in the first direction X and condenses it. The microlens ML has the function of condensing the light linearly in the second direction Y. That is, a beam long axis DR2 of a beam cross-section condensed by the microlens ML is parallel to the generatrix of the microlens ML, and is parallel to the transparent axis direction DR1 of the first polarizer PL1.

The aperture SL of the reflective layer RL is a slit extending parallel to the second direction Y. That is, a slit long axis DR3 of the aperture SL is parallel to the beam long axis DR2 of the microlens ML. In other words, the microlens ML is a cylindrical lens which condenses the excitation light to a straight line (the beam long axis DR2) parallel to the extending direction of the aperture SL (i.e., the slit long axis DR3). Accordingly, the extending direction (the slit long axis DR3) of the aperture SL is parallel to the direction of polarization of the excitation light.

In the example illustrated, the emitting material provided in the wavelength conversion element is a quantum rod QR aligned parallel to the second direction Y, for example. A long-axis direction of the quantum rod QR is parallel to the polar axis of the quantum rod QR, and is parallel to an absorption axis direction DR4 of the quantum rod QR. In the example illustrated, the absorption axis direction DR4 is parallel to the slit long axis DR3, the beam long axis DR2, and the transparent axis direction DR1.

The excitation light EX which has passed through the first polarizer PL1 is polarized in the transparent axis direction DR1 and enters the microlens ML. At this time, the excitation light EX is S polarization with respect to the lower surface of the microlens ML, and passes through the aperture SL while maintaining the direction of polarization. The quantum rod QR absorbs the excitation light EX polarized in the absorption axis direction DR4 of the quantum rod QR, and emits emission light IR polarized in a polarization direction DR5. At this time, the polarization direction DR5 is parallel to the absorption axis direction DR4, the slit long axis DR3, the beam long axis DR2, and the transparent axis direction DR1. That is, the directions of polarization of the excitation light EX and the emission light IR are parallel to the main surface of each of the layers of the display panel PNL.

The display device DSP of the present embodiment comprises the support substrate 110, the microlenses ML formed on the upper part of the main surface of the support substrate 110, the reflective layer RL which is disposed above the microlenses ML and comprises the apertures SL, and the wavelength conversion element WC which is opposed to the microlenses ML via the reflective layer RL.

Since the display device DSP comprises the reflective layer RL having the apertures SL above the microlenses ML, the excitation light EX can be efficiently introduced to the wavelength conversion element WC through the apertures SL. Also, by the presence of the reflective layer RL arranged on the lower surface of the wavelength conversion element WC, it is possible to suppress returning of the excitation light EX to the bottom, and reflect the emission light IR emitted downward to the upper part. Accordingly, the present embodiment enables the light use efficiency of the excitation light EX, which is emitted from the backlight unit EL serving as the light source, to be improved. Further, by the improvement of the light use efficiency of the light source, even if the brightness of the excitation light EX is suppressed, the display device DSP can display an image of sufficient brightness. That is, according to the present embodiment, a display device DSP of low power consumption can be provided.

Further, the display device DSP comprises the dielectric multilayer film DM on the wavelength conversion element WC. The dielectric multilayer film DM selectively reflects the excitation light EX, and passes the emission light IR. Accordingly, the display device DSP can reflect the excitation light EX multiple times between the reflective layer RL and the dielectric multilayer film DM, and trap the excitation light EX within the wavelength conversion element WC. That is, the length of the optical path of the excitation light EX in the wavelength conversion element WC can be increased. Thus, according to the present embodiment, even if the thickness of the wavelength conversion element WC in the third direction Z is small, it becomes possible to improve the photoabsorptivity of the excitation light EX in the wavelength conversion element WC, and improve the wavelength conversion efficiency of the wavelength conversion element WC. Note that in the present embodiment, a reflectivity against the excitation light EX of the dielectric multilayer film DM is higher than that of the reflective layer RL. Accordingly, the excitation light EX not absorbed after multiple reflection passes through the apertures SL or the reflective layer RL, and is emitted to the back surface side of the display panel PNL. Therefore, according to the present embodiment, it is possible to suppress occurrence of color mixture caused by simultaneous emission of the emission light IR and the excitation light EX from the front surface of the wavelength conversion element WC. In addition, a reflectivity against the emission light IR of the dielectric multilayer film DM is lower than that of the reflective layer RL. Consequently, according to the present embodiment, the emission light IR can be emitted at high efficiency from the front surface of the wavelength conversion element WC.

Also, the wavelength conversion element WC comprises quantum dots QD1 and QD2 as the emitting material. The quantum dots can select the wavelength of emission light according to the particle diameter. Also, since the excitation level of the quantum dot is discrete, narrowband emission light is emitted. Therefore, according to the present embodiment, a display device DSP whereby fine color adjustment is enabled, and in which color purity is high can be provided. Also, the quantum dots QD1 and QD2 are quantum rods QR having optical absorption anisotropy, and emit polarized emission light IR. For this reason, the wavelength converter CF (the wavelength conversion element WC) can be arranged between the first polarizer PL1 and the second polarizer PL2, and the degree of freedom of design of the display device DSP can be improved. Further, in the present embodiment, while the wavelength conversion element WC is embedded in the first substrate 100, it can be similarly embedded in the second substrate 200. In other words, in the display device DSP, since the wavelength converter CF can be arranged close to the liquid crystal layer LQ, it is possible to prevent color mixture, which occurs when light, which has passed through the liquid crystal layer LQ in a certain pixel, passes through the wavelength converter CF of an adjacent pixel, from occurring.

In addition, since the beam long axis DR2 of the excitation light EX condensed by the microlens ML and the slit long axis DR3 of the aperture SL are parallel to each other, light condensed by the microlens ML suppresses reflection by the lower surface of the reflective layer RL, and can be introduced to the wavelength conversion element WC efficiently. Also, the beam long axis DR2 and the slit long axis DR3 are parallel to the transparent axis direction DR1 of the first polarizer PL1, and parallel to the direction of polarization of the excitation light EX which enters the microlens ML. Therefore, according to the present embodiment, since the direction of polarization of the excitation light EX does not change when the excitation light EX enters the microlens ML, the excitation light EX enters with S polarization with respect to the lower surface of the dielectric multilayer film DM, and is reflected. Since the dielectric multilayer film DM has a reflectivity of 90% in all angles of incidence with respect to the excitation light EX which enters with S polarization, the present embodiment enables the excitation light EX to be trapped in the wavelength conversion element WC at high efficiency, and the wavelength conversion efficiency of the wavelength conversion element WC to be improved.

Further, the absorption axis of the wavelength conversion element WC corresponds to the absorption axis direction DR4 of the quantum rod QR aligned in a predetermined direction. Since the absorption axis direction DR4 is parallel to the beam long axis DR2 and the transparent axis direction DR1, according to the present embodiment, the wavelength conversion efficiency of the wavelength conversion element WC can be improved.

As described above, according to the present embodiment, a wavelength converter CF whose light use efficiency has improved and a display device DSP using the same can be provided.

Next, modifications of the present embodiment will be described referring to FIGS. 7 to 10. Note that also in each of the modifications, an advantage similar to that of the present embodiment can be obtained.

Figure 7:
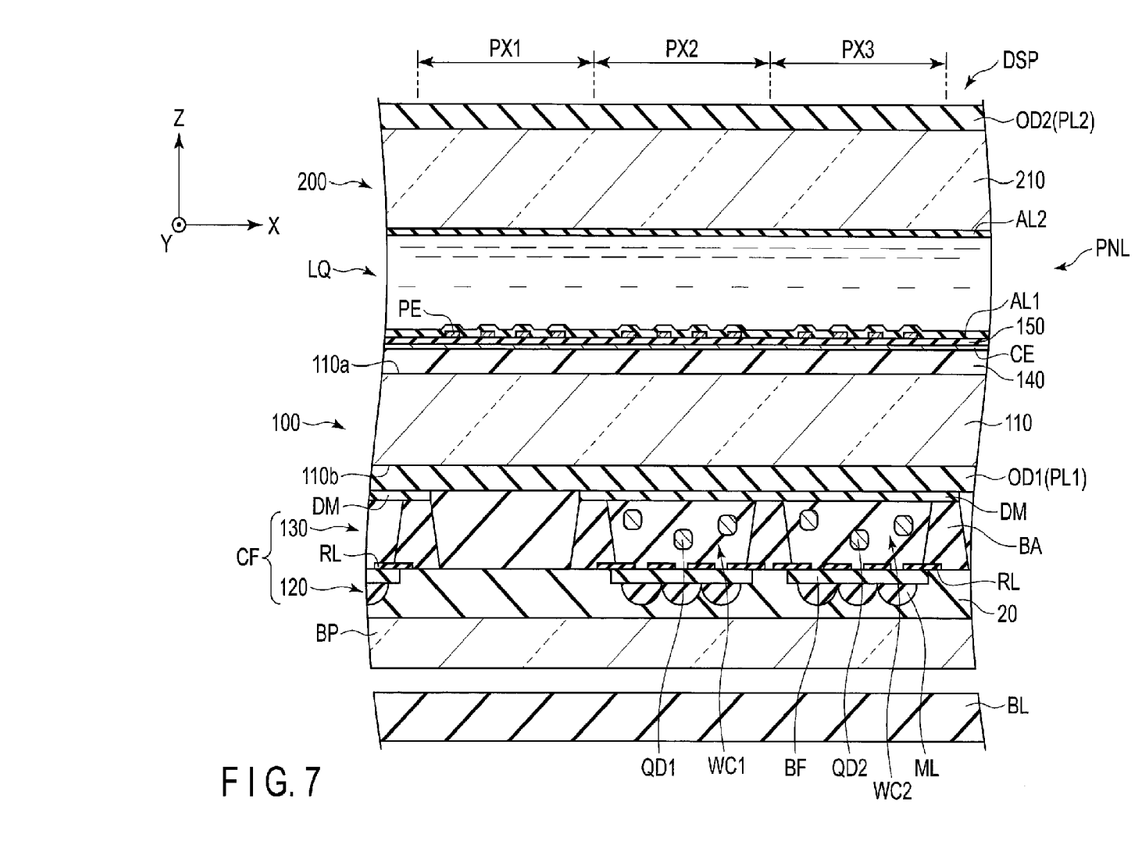
FIG. 7 is a view showing a cross-section of a display device according to a first modification.

FIG. 7 is a view which shows a cross-section of a display device according to a first modification.

This modification corresponds to an example in which the wavelength conversion element is disposed between the light source and the first polarizer. That is, the first modification is different from the present embodiment illustrated in FIG. 3 in that the wavelength converter CF and a support substrate BP are disposed between the first polarizer PL1 and the backlight unit BL. In the present modification, the wavelength converter CF is arranged above the support substrate BP, and the wavelength conversion layer 130 is arranged below the first polarizer PL1.

Figure 8:
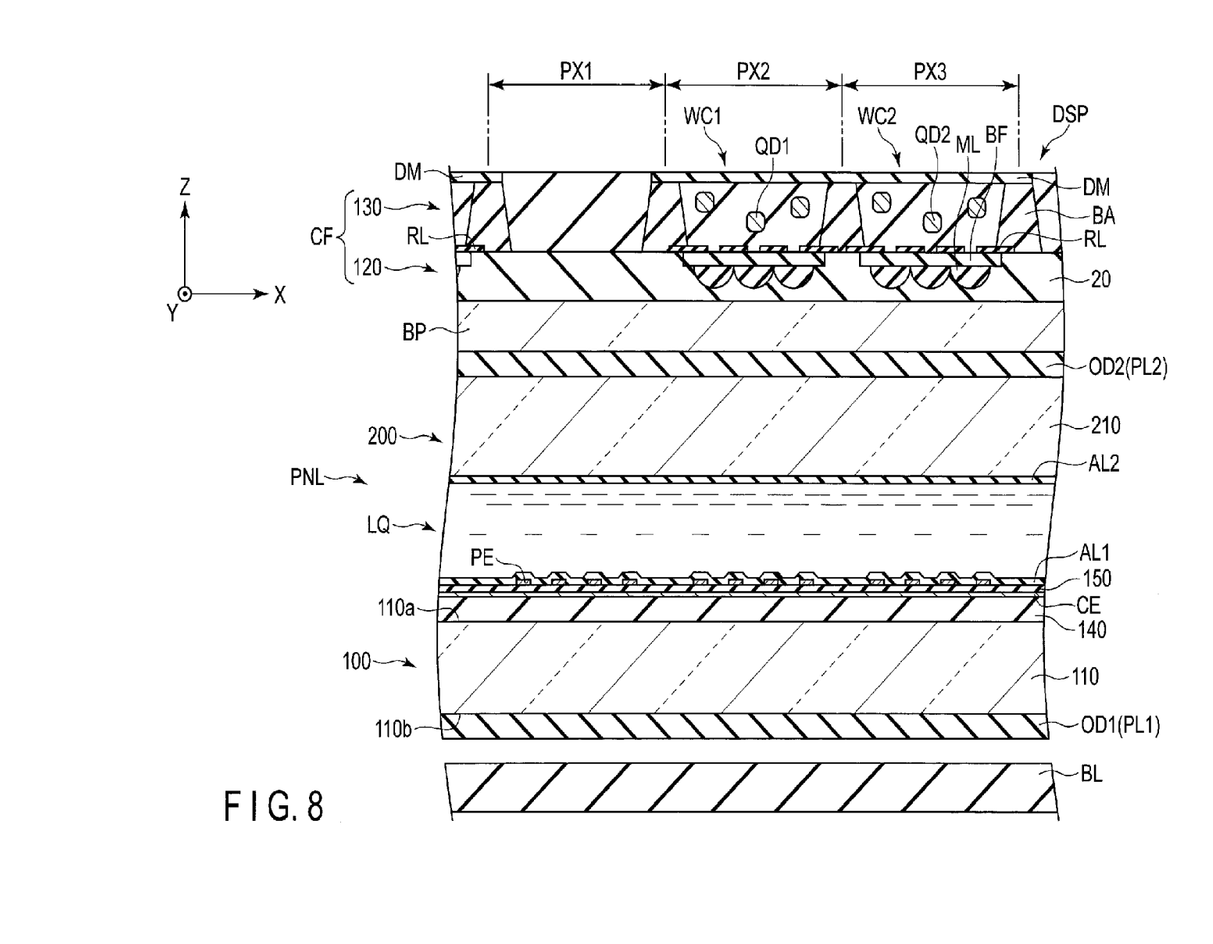
FIG. 8 is a view showing a cross-section of a display device according to a second modification.

FIG. 8 is a view which shows a cross-section of a display device according to a second modification.

This modification corresponds to an example in which the wavelength conversion element is disposed at a position opposed to the display panel via the second polarizer. That is, the second modification is different from the present embodiment illustrated in FIG. 3 in that the wavelength converter CF and the support substrate BP are disposed above the second polarizer PL2. In the present modification, the wavelength converter CF is arranged above the support substrate BP, and the support substrate BP is arranged above the second polarizer PL2.

According to the first modification and the second modification, since the degree of polarization of each of the first polarizer PL1 and the second polarizer PL2 is higher than that of emission light from the first quantum dot QD1 and the second quantum dot QD2, which are the quantum rods, a high-contrast display device DSP can be provided.

Figure 9:
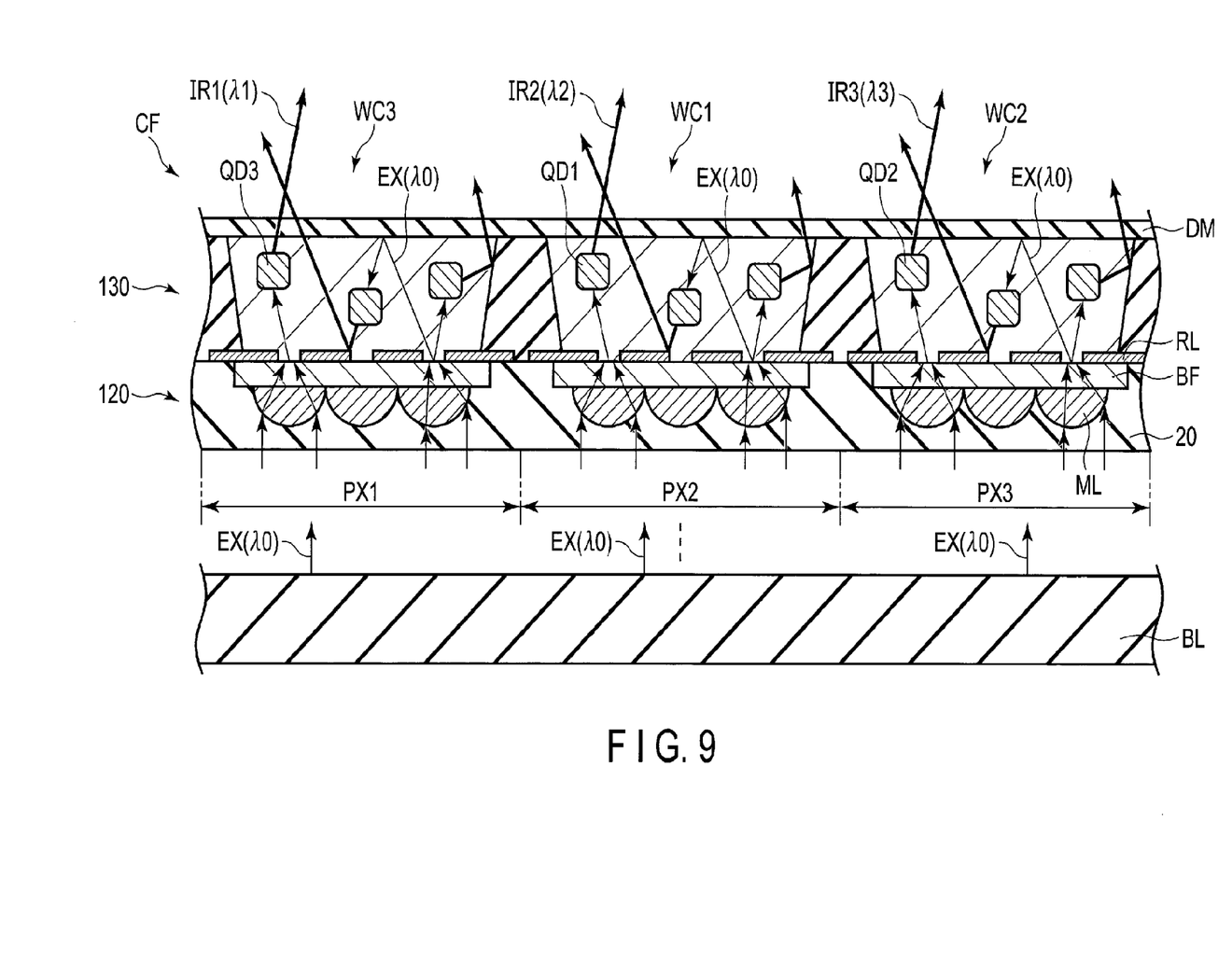
FIG. 9 is a view showing a modification of a light source and a wavelength conversion layer.

FIG. 9 is a view which shows a modification of a light source and a wavelength conversion layer.

This modification is different from the present embodiment illustrated in FIG. 3 in that the excitation light EX is ultraviolet (UV) light, and the wavelength conversion layer 130 comprises a third wavelength conversion element WC3. In the present modification, the backlight unit BL emits excitation light EX having wavelength λ0 of ultraviolet (UV) region. The third wavelength conversion element WC3 formed in a region corresponding to the first pixel PX1 absorbs the excitation light EX, and emits the first emission light IR1 of wavelength λ1. The first wavelength conversion element WC1 and the second wavelength conversion element WC2 emit the second emission light IR2 and the third emission light IR3, respectively.

According to the present modification, even if the excitation light EX leaks out to the display surface side from each of the wavelength conversion elements, since wavelength λ0 is in the range of the UV region, it is possible to prevent color purity from being degraded by color mixture of the excitation light and the emission light.

Figure 10:
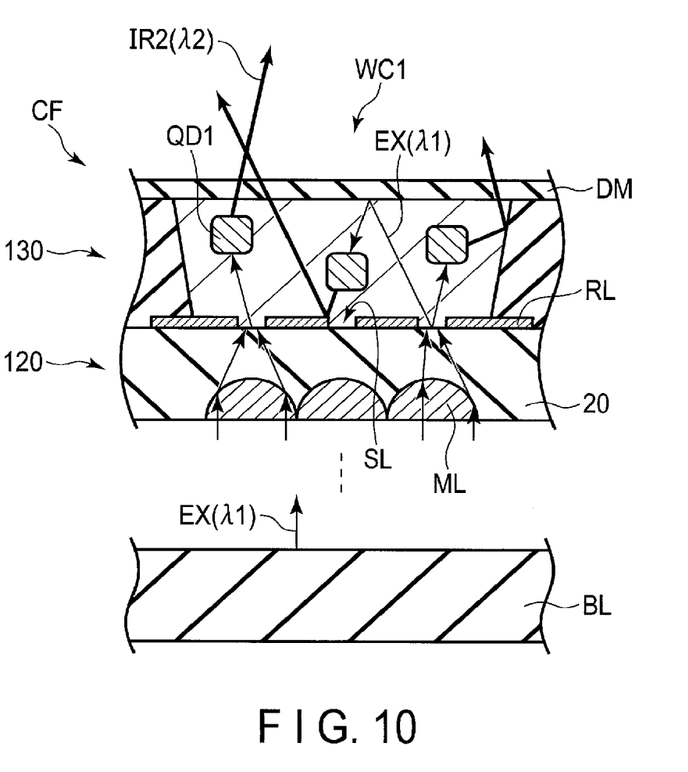
FIG. 10 is a view showing a modification of a microlens.

FIG. 10 is a view which shows a modification of a microlens.

This modification is different from the present embodiment illustrated in FIG. 3 in that the microlens ML has a convex shape protruding upward. In this modification, a refractive index of the microlens ML is higher than that of the optical material layer 20. Accordingly, when the excitation light EX enters the optical material layer 20 from the microlens ML, the excitation light EX is refracted at the upper surface of the microlens ML, and is condensed to the aperture SL.

According to the present modification, since the optical material layer 20 is positioned between the microlenses ML and the reflective layer RL, the optical material layer 20 can take on the function of the buffer layer BF. That is, by omitting the step of forming the buffer layer BF, a manufacturing process of the display device DSP can be simplified, and the thickness of the display panel PNL can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wavelength converter comprising:
   a microlens which condenses excitation light;
   a reflective layer which is opposed to the microlens and includes an aperture; and
   a wavelength conversion element which is opposed to the microlens via the reflective layer, absorbs the excitation light, and emits emission light whose wavelength is different from that of the excitation light,
   wherein the wavelength conversion element has optical absorption anisotropy.

2. The wavelength converter of claim 1, wherein the wavelength conversion element comprises a quantum dot which absorbs the excitation light and emits the emission light.

3. The wavelength converter of claim 1, wherein:
   the aperture extends in one direction; and
   the microlens is a cylindrical lens which condenses the excitation light linearly parallel to the direction in which the aperture extends.

4. The wavelength converter of claim 3, wherein the direction in which the aperture extends is parallel to a direction of polarization of the excitation light.

5. The wavelength converter of claim 4, wherein an absorption axis direction of the wavelength conversion element is parallel to the direction in which the aperture extends.

6. The wavelength converter of claim 2, wherein the quantum dot is shaped like a rod having a long axis.

7. The wavelength converter of claim 6, wherein the quantum dot has a polar axis which agrees with the long axis.

8. The wavelength converter of claim 1, further comprising a buffer layer which adjusts a focal distance of the microlens between the microlens and the reflective layer.

9. The wavelength converter of claim 1, further comprising a dielectric multilayer film which is opposed to the reflective layer via the wavelength conversion element, and whose reflectivity against the excitation light is higher than that against the emission light.

10. The wavelength converter of claim 9, wherein the reflectivity of the dielectric multilayer film against S-polarized excitation light becomes 90% or more at all angles of incidence.

11. The wavelength converter of claim 9, wherein the reflective layer has a lower reflectivity against the excitation light and a higher reflectivity against the emission light as compared to the reflectivities exhibited by the dielectric multilayer film.

12. The wavelength converter of claim 1, wherein the excitation light is blue light or ultraviolet light.

13. A display device comprising:
a display panel comprising a first substrate, a second substrate arranged to be opposed to the first substrate, and a liquid crystal layer held between the first substrate and the second substrate;
a light source which is disposed on a side opposed to the first substrate of the display panel, and emits excitation light toward the display panel;
a first polarizer arranged between the first substrate and the light source;
a second polarizer opposed to the first polarizer via the display panel; and
a wavelength converter comprising microlenses which condense the excitation light, a reflective layer which is opposed to the microlenses and includes apertures, and a first wavelength conversion element and a second wavelength conversion element which are opposed to the microlenses via the reflective layer, absorb the excitation light, and emit first emission light and second emission light whose wavelengths are different from the wavelength of the excitation light, respectively,
wherein directions of polarization of the first and second emission light are parallel to a direction of polarization of the excitation light when the excitation light is absorbed by the first and second wavelength conversion elements.

14. The display device of claim 13, wherein:
the first wavelength conversion element comprises a first quantum dot which absorbs the excitation light and emits the first emission light;
the second wavelength conversion element comprises a second quantum dot which absorbs the excitation light and emits the second emission light;
the excitation light is blue light;
the first emission light is green light; and
the second emission light is red light.

15. The display device of claim 13, wherein:
the first wavelength conversion element comprises a first quantum dot which is shaped like a rod and has a first long axis;
the second wavelength conversion element comprises a second quantum dot which is shaped like a rod and has a second long axis whose size is different from that of the first long axis;
the first quantum dot has a first absorption axis parallel to the first long axis;
the second quantum dot has a second absorption axis parallel to the second long axis; and
the first and second long axes are parallel to the first and second absorption axes, respectively, and are parallel to a transparent axis direction of the first polarizer.

16. The display device of claim 13, wherein:
the apertures extend in a direction parallel to a transparent axis direction of the first polarizer; and
each of the microlenses is a cylindrical lens which has a generatrix parallel to the transparent axis direction, and linearly condenses the excitation light parallel to a direction in which the apertures extend.

17. The display device of claim 13, further comprising a dielectric multilayer film which is opposed to the reflective layer via the wavelength conversion elements, and whose reflectivity against the excitation light is higher than those against the first and second emission light.

18. The display device of claim 13, wherein the wavelength converter is arranged between the light source and the first polarizer within the display panel, or at a position opposed to the display panel via the second polarizer.

* * * * *